United States Patent
Ge et al.

(10) Patent No.: US 10,618,428 B2
(45) Date of Patent: Apr. 14, 2020

(54) VARIABLE VOLTAGE CONTROLLER

(71) Applicant: Ford Global Technologies, LLC, Dearborn, MI (US)

(72) Inventors: Baoming Ge, Okemos, MI (US); Lihua Chen, Farmington Hills, MI (US); Shuitao Yang, Canton, MI (US); Yan Zhou, Canton, MI (US); Fan Xu, Novi, MI (US); Khorshed Khorshed Alam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 15/653,779

(22) Filed: Jul. 19, 2017

(65) Prior Publication Data
US 2019/0023144 A1    Jan. 24, 2019

(51) Int. Cl.
| | |
|---|---|
| B60L 3/00 | (2019.01) |
| H04L 12/40 | (2006.01) |
| H02J 7/00 | (2006.01) |
| B60K 6/52 | (2007.10) |
| B60L 58/10 | (2019.01) |
| H02J 7/14 | (2006.01) |

(52) U.S. Cl.
CPC ............... B60L 58/10 (2019.02); B60K 6/52 (2013.01); B60L 3/003 (2013.01); H02J 7/0024 (2013.01); H02J 7/1423 (2013.01); H04L 12/40006 (2013.01); B60L 2240/42 (2013.01); H01M 2220/20 (2013.01); H02J 2007/0067 (2013.01); H02J 2207/20 (2020.01)

(58) Field of Classification Search
CPC .... B60K 6/52; B60L 11/1851; B60L 2240/42; B60L 3/003; B60L 58/10; H02J 7/0024; H04L 12/40006; H01M 2220/20
See application file for complete search history.

(56) References Cited

U.S. PATENT DOCUMENTS

| | | | |
|---|---|---|---|
| 8,368,286 B2 | 2/2013 | Meyer | |
| 2013/0154521 A1* | 6/2013 | Butzmann | H01M 10/425 318/139 |
| 2013/0300192 A1* | 11/2013 | Inaba | H01M 10/482 307/9.1 |

OTHER PUBLICATIONS

Lin, Ray-Lee, Piezoelectric Transformer Characterization and Application of Electronic Ballast, Dissertation submitted to the Faculty of the Virginia Polytechnic Institute and State University in partial fulfillment of the requirement for the degree of Doctor of Philosophy in Electrical Engineering, Nov. 26, 2001, 171 pages, Blacksburg, Virginia.

* cited by examiner

*Primary Examiner* — Adam A Arciero
(74) *Attorney, Agent, or Firm* — Brooks Kushman PC; David Kelley

(57) ABSTRACT

A vehicle includes an inverter connected to an energy store having a variable output voltage and including a first pair of battery partitions. The vehicle includes a controller configured to operate a first set of switches to arrange electrical connections between the first pair such that the variable output voltage is greater than battery voltage of a one of the battery partitions. The operation of switches is responsive to a parameter indicative of speed of an electric machine electrically coupled to the inverter exceeding a first predetermined threshold.

5 Claims, 7 Drawing Sheets

VARIABLE VOLTAGE CONTROLLER

TECHNICAL FIELD

This disclosure relates to variable voltage controllers.

BACKGROUND

Electric machines and associated inverters draw power from a bus. Variable voltage controllers (VVC) may adjust bus voltage to meet varying voltage demands of the electric machine and inverter. VVCs typically have a boost converter structure, which includes two high-speed switches (e.g., IGBTs) configured to selectively conduct current from an inductor. High-speed switching imposes substantial switching losses, and inductors may require additional cooling or add unnecessary bulk to inverter systems.

SUMMARY

A vehicle includes an inverter connected to an energy store having a variable output voltage and including a first pair of battery partitions. The vehicle includes a controller configured to operate a first set of switches to arrange electrical connections between the first pair such that the variable output voltage is greater than battery voltage of a one of the battery partitions. The operation of switches is responsive to a parameter indicative of speed of an electric machine electrically coupled to the inverter exceeding a first predetermined threshold.

A vehicle includes an inverter connected to an energy store having a variable output voltage and including a first pair of battery partitions. The vehicle includes a controller configured to operate a first set of switches to arrange electrical connections between the first pair such that the variable output voltage is equal to battery voltage of a one of the battery partitions. The operation of switches is responsive to a parameter indicative of speed of an electric machine electrically coupled to the inverter falling below a second predetermined threshold.

A vehicle includes an inverter connected to an energy store having a variable output voltage and including a modular set of battery partitions. The vehicle includes a controller configured to operate a set of switches configured to organize the set in series and parallel configurations such that the variable output voltage coincides with a voltage requirement of the inverter based on the predetermined range. The operation is responsive to a speed of an electric machine electrically coupled to the inverter falling within one of a plurality of predetermined ranges.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Inverters may have varying voltage demands depending on the speed and torque requirements of an attached electric machine. For example, higher electric machine speed demands may necessitate higher inverter bus voltages. Meaning, inverter bus voltage must be variable to provide a wider range of available motor speeds without waste. Bus voltage may be adjusted through the organization of switches and battery partitions. The switches may organize the connections between the battery partitions to arrange the partitions in parallel or series. This organization changes the voltage output of the entire energy store.

The switches may be any type of connecting and disconnecting implement. Typically, IGBTs are used in similar VVC applications; however, such high-frequency switches are not necessary. Low-frequency switches (e.g., solenoids, relays) may be used to organize the battery partitions and pairs of battery partitions. Other types of switches or connection mechanisms may be used (e.g., MOSFETs, BJTs).

Figure 1:
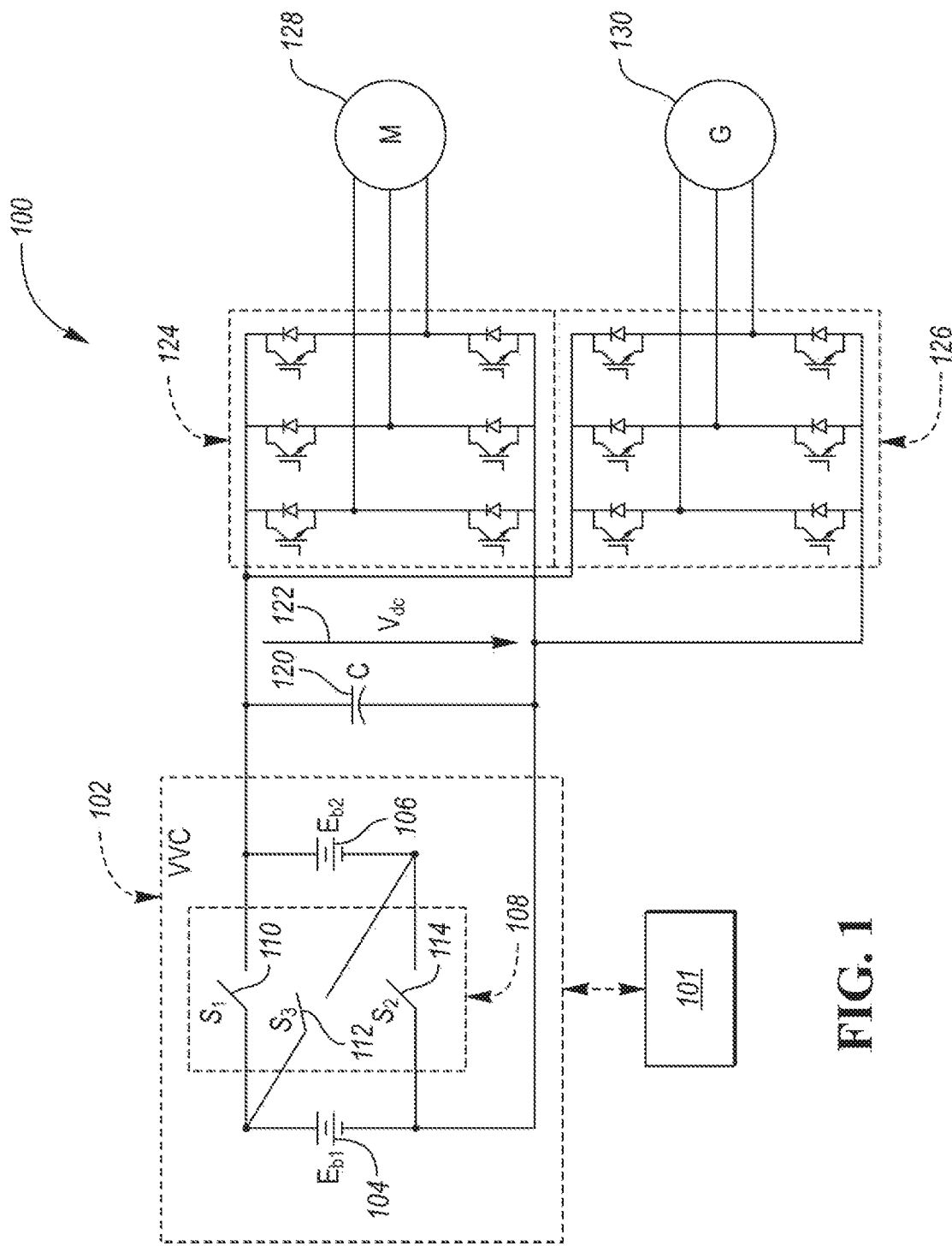
FIG. 1 is a schematic diagram of a VVC energizing a bus powering an inverter connected to a motor and generator of a vehicle.
Figure 2:
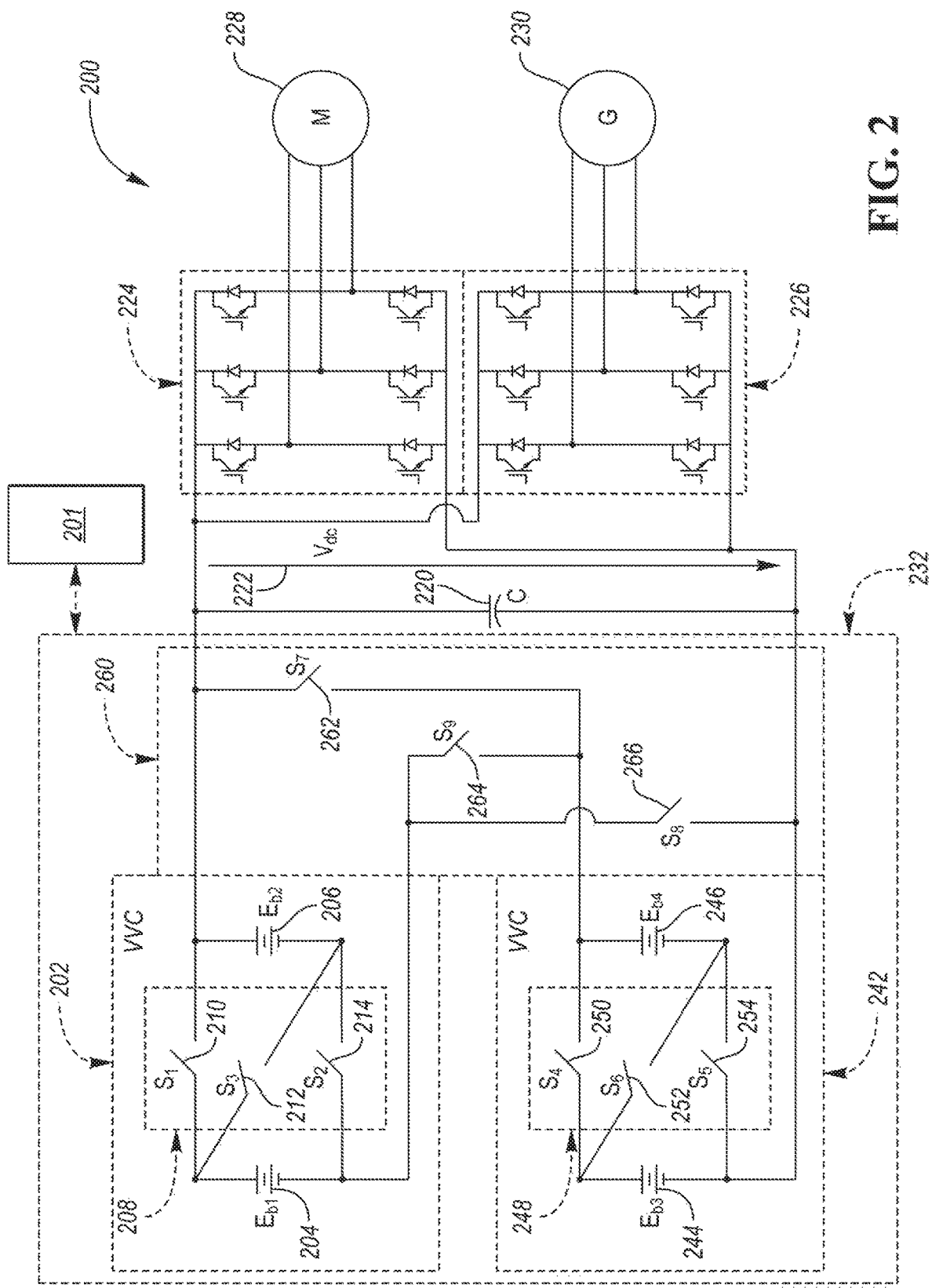
FIG. 2 is a schematic diagram of a VVC energizing a bus powering a motor and generator of a vehicle including first and second pairs of battery partitions.

Referring to FIG. 1, an electrical drive system 100 is shown. The electrical drive system 100 includes an energy store 102. The energy store 102 may include numerous sources of energy. For example, capacitors, chemical batteries, rectifiers, commutators, photovoltaic cells, fuel cells, etc. The energy store may include a pair of battery partitions 104, 106. The battery partitions 104, 106 may be any energy source listed or not listed above. For example, the battery partitions 104, 106 may be battery modules of a battery assembly. Battery assemblies typically include tens or hundreds of individual battery modules. The battery modules 104, 106 may include Lithium-ion, Nickle-Cadmium, or other battery chemistries.

A controller 101 may be configured to operate a set of switches 108 to arrange electrical connections between the first battery partition 104 and the second battery partition 106. As discussed above, the switches may be of any kind. The set of switches 108 includes a first switch, $S_1$ 110, a second switch, $S_2$ 114, and a third switch, $S_3$ 112. When $S_1$ 110 and $S_2$ 114 are closed and $S_3$ 112 is open, a parallel circuit is formed between the battery partitions 104, 106 and the bus $V_{dc}$ 122. When $S_1$ 110 and $S_2$ 114 are open and $S_3$ 112 is closed, a series circuit is formed between the battery partitions 104, 106 and the bus $V_{dc}$ 122. A DC link capacitor 120 may be used to stabilize $V_{dc}$ 122 bus voltage. $V_{dc}$ 122 powers at least one inverter 124, 126 connected to the same or different electric machines 128, 130. The inverters 124, 126 may contain switches independent from the set of switches 108. The inverters 124, 126 use pulse width modulation (PWM) to generate sinusoidal signals for the electric machines 128, 130. The electric machines may be operated in a motoring or generating mode.

The set of switches 108 may be configured to organize the battery partitions 104, 106 in response to motor 128 speed exceeding a predetermined threshold. For example, a motor 128 having a speed above 1,000 revolutions per minute may require a higher bus voltage, $V_{dc}$ 122, in order to reach or maintain such speeds. The energy store 102 may be organized so that the battery modules 104, 106 are in series to increase the output voltage of the energy store 102. In similar fashion, the set of switches 108 may be configured to organize the battery partitions 104, 106 in response to motor 128 speed less than a predetermined threshold. For example, a motor 128 having a speed below 1,000 revolutions per minute may require a lower bus voltage, $V_{dc}$ 122. The energy store 102 may be organized so that the battery modules 104, 106 are in parallel to lower the output voltage of the energy store 102. The controller 101 may be configured to orchestrate the switch positions depending on the speed of the electric machines 128, 130.

The controller 101 may be configured to predict threshold transitions to ensure adequate voltage is available to the inverter. For example, an electric machine may have a rate of change during acceleration or deceleration events. The controller may be configured to preemptively raise the output voltage of the energy store 102 through organization or arrangement of the switches in anticipation of the motor speed exceeding the threshold. The preemptive change may be based on a switching time of the switches. For example, relays may take 15 ms to settle after actuation. Therefore, the controller 101 may be configured to arrange the set of switches 108 at least 15 ms prior to the threshold being exceeded, which is based on the instantaneous or historical rate of change of the electric machine.

Multiple inverters 124, 126 and electric machines 128, 130 may draw power from the same voltage bus 122. The controller 101 may choose one of the electrical machines 128, 130 to base the voltage requirements on. For example, the controller 101 may use the electrical machine 128, 130 that is in a motor mode. The controller 101 may use a speed of the motoring electrical machine 128 to serve as a basis for the voltage requirement. The controller 101 may use a combination of the motor and generator speeds as a basis for the voltage requirement. The controller 101 may use the highest voltage requirement from one of the motoring electric machines 128.

Referring to FIGS. 2-5, an electrical drive system 200 is shown. The electrical drive system 200 includes an energy store 232. The energy store 232 may include numerous sources of energy, as discussed above. The energy store 232 may include a first pair 202 of battery partitions 204, 206. The first pair 202 of battery partitions 204, 206 may be any energy source listed or not listed above. The first pair 202 of battery partitions 204, 206 may be battery modules of a battery assembly, as discussed above. The energy store 232 may include a second pair 242 of battery partitions 244, 246. The second pair 242 of battery partitions 244, 246 may be any energy source listed or not listed above. The second pair 242 of battery partitions 244, 246 may be battery modules of the battery assembly discussed above or a separate battery assembly. Each pair 202, 242 include a first and second set of switches 208, 248, respectively. A third set of switches 260 may be configured to arrange electrical connections between the pairs 202, 242.

A controller 201 may be configured to operate the sets of switches 208, 248 to arrange electrical connections between the first and second pair 202, 242 battery partitions 204, 206, 244, 246. Each set of switches 208, 248, 260 includes a first switch, ($S_1$ 210, $S_4$ 250, $S_7$ 262), a second switch, ($S_2$ 214, $S_5$ 254, $S_8$ 266), and a third switch, ($S_3$ 212, $S_6$ 252, $S_9$ 264).

When $S_1$ 210 and $S_2$ 214 are closed and $S_3$ 212 is open, a parallel circuit is formed between the battery partitions 204, 206. When $S_1$ 210 and $S_2$ 214 are open and $S_3$ 212 is closed, a series circuit is formed between the battery partitions 204, 206. When $S_4$ 250 and $S_5$ 254 are closed and $S_6$ 252 is open, a parallel circuit is formed between the battery partitions 244, 246. When $S_4$ 250 and $S_5$ 254 are open and $S_6$ 252 is closed, a series circuit is formed between the battery partitions 244, 246.

The pairs 202, 242 of the energy store 232 are arrangeable via the third set of switches 260. When $S_7$ 262 and $S_8$ 266 are closed and $S_9$ 264 is open, a parallel circuit is formed between the pairs 202, 242 and the bus $V_{dc}$ 222. When $S_7$ 262 and $S_8$ 266 are open and $S_9$ 264 is closed, a series circuit is formed between the pairs 202, 242 and the bus $V_{dc}$ 222.

A DC link capacitor 220 may be used to stabilize $V_{dc}$ 222 bus voltage. $V_{dc}$ 222 powers at least one inverter 224, 226 connected to the same or different electric machines 228, 230. The inverters 224, 226 may contain switches independent from the set of switches 208, 248, 260. The inverters 224, 226 use pulse width modulation (PWM) to generate sinusoidal signals for the electric machines 228, 230. The electric machines may be operated in a motoring or generating mode.

The energy store 232 may be configured to provide any number of voltage values to the inverter 224. For example, the energy store 232 may have four battery modules, each having a 100-volt output. In a parallel configuration, the energy store 232 voltage output is 100 volts. In a hybrid configuration, the energy store 232 voltage output is 200 volts. In a series configuration, the energy store 232 voltage output is 400 volts.

Figure 3A:
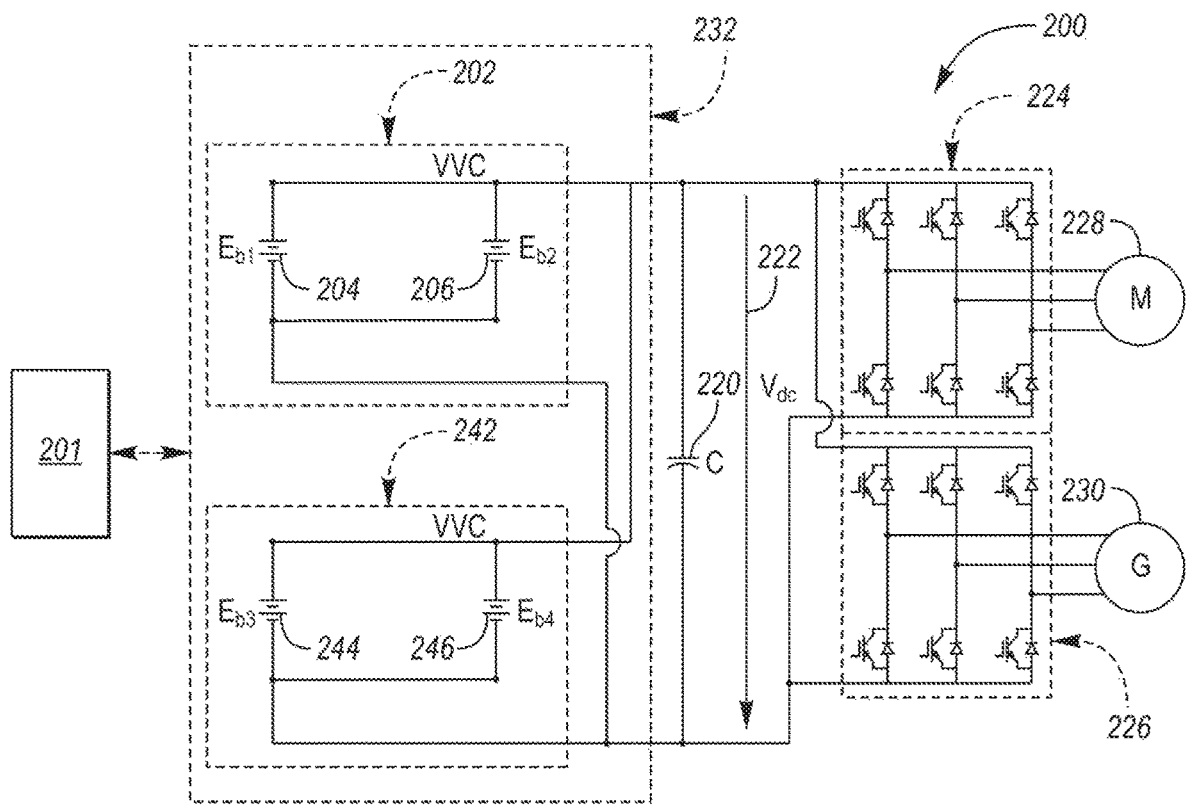
FIG. 3A is a schematic diagram of a VVC energizing a bus powering a motor and generator of a vehicle including first and second pairs of battery partitions organized in parallel, each having battery partitions in parallel.
Figure 3B:
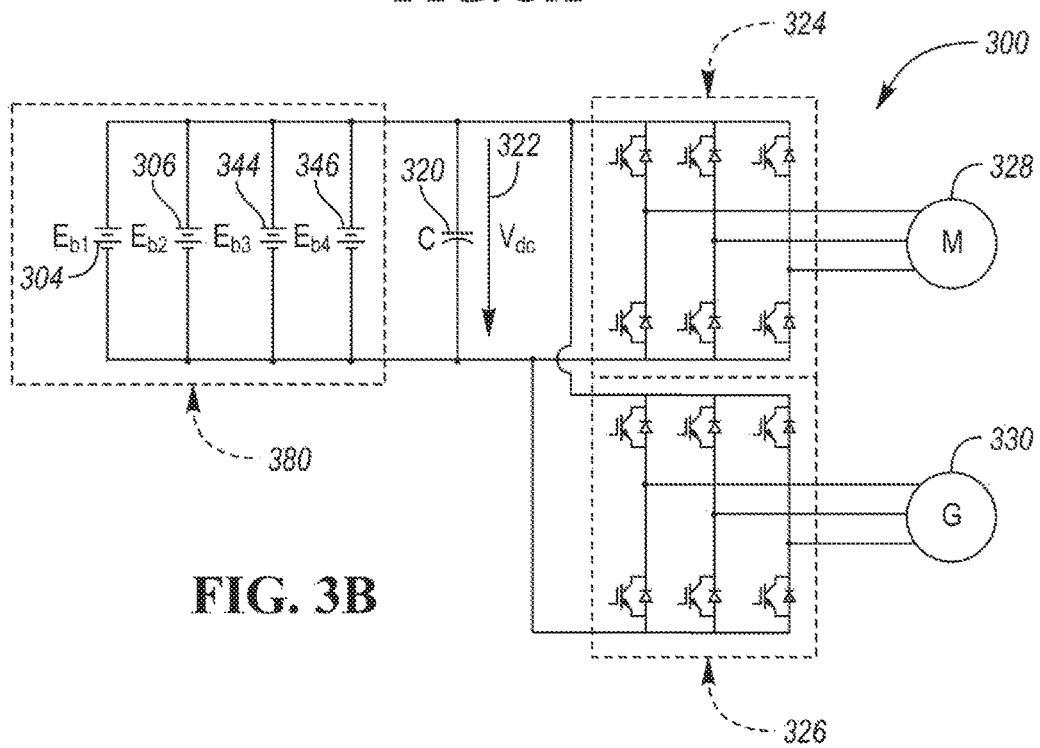
FIG. 3B is a schematic representation of the VVC of FIG. 3A.

As shown in FIGS. 3A and 3B, the battery modules 204, 206, 244, 246 may be arranged in parallel in each pair 202, 242, and the pairs 202, 242 may be arranged in parallel, schematically forming an entirely parallel electrical drive system 300. The parallel electrical drive system 300 has an energy store 380 having each battery module 304, 306, 344, 346 in parallel with the bus $V_{dc}$ 322 and DC link capacitor 320. The voltage, $V_{dc}$ 322, on the bus powers a pair of inverters 324, 326, which are coupled to electric machines 328, 330. $V_{dc}$ 322 is equal to one of the battery modules 304, 306, 344, 346. Any number of inverters or electric machines may be used. Multiple inverters may feed a single electric machine or vice versa.

Figures 4A, 4B:
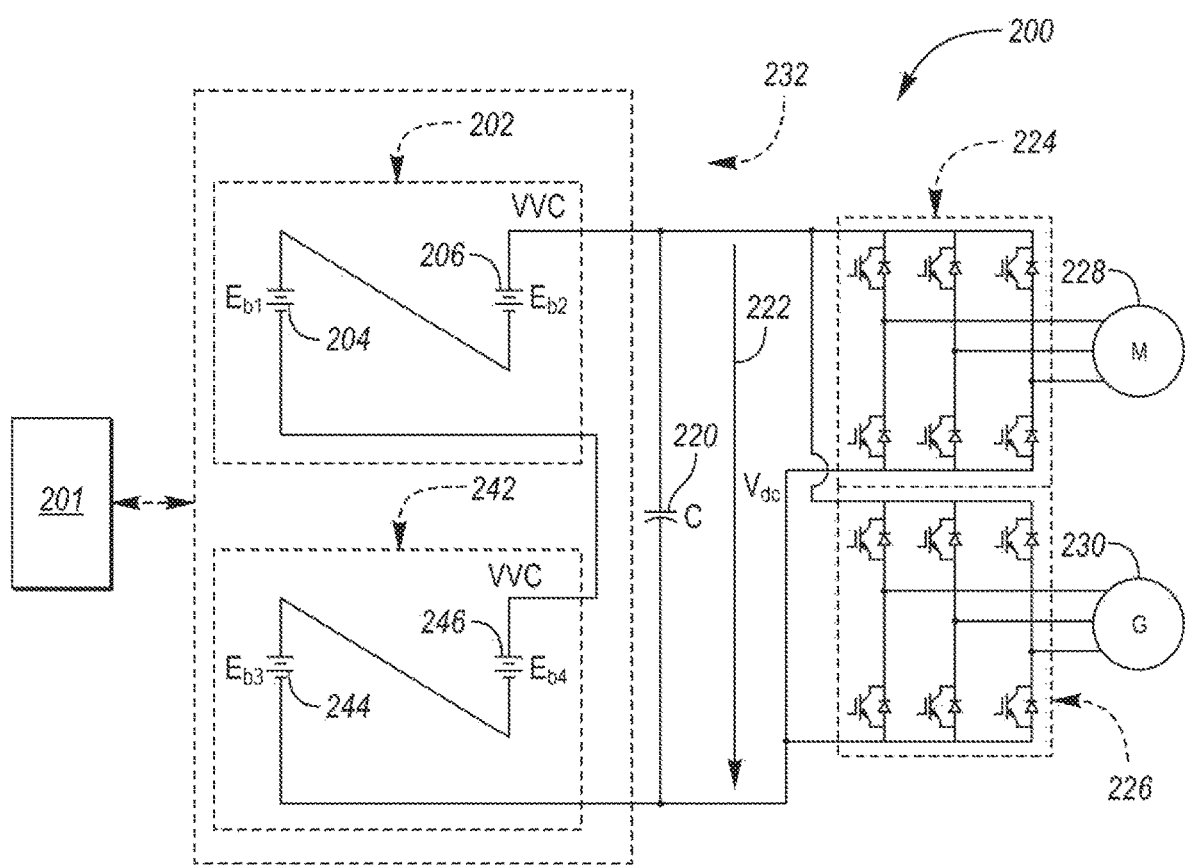
FIG. 4A is a schematic diagram of a VVC energizing a bus powering a motor and generator of a vehicle including first and second pairs of battery partitions organized in series, each having battery partitions in series.
FIG. 4B is a schematic representation of the VVC of FIG. 4A.

As shown in FIGS. 4A and 4B, the battery modules 204, 206, 244, 246 may be arranged in series in each pair 202, 242, and the pairs 202, 242 may be arranged in series, schematically forming an entirely serial electrical drive system 300. The serial electrical drive system 300 has an energy store 380 having each battery module 302, 304, 342, 344 in series with the bus $V_{dc}$ 322 and DC link capacitor 320. The voltage, $V_{dc}$ 322, on the bus powers a pair of inverters 324, 326, which are coupled to electric machines 328, 330. $V_{dc}$ 322 is equal to the sum of the battery modules 302, 304, 342, 344. Any number of inverters or electric machines may be used. Multiple inverters may feed a single electric machine or vice versa.

Figure 5A:
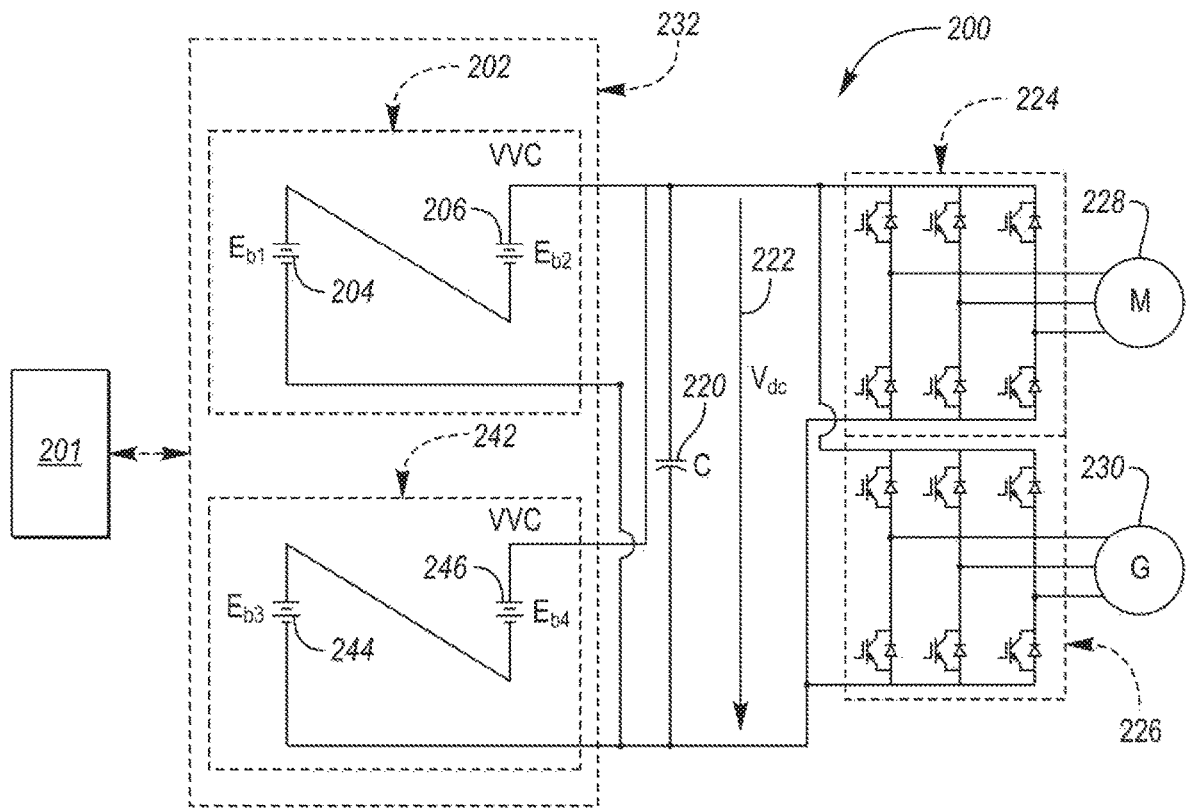
FIG. 5A is a schematic diagram of a VVC energizing a bus powering a motor and generator of a vehicle including first and second pairs of battery partitions organized in parallel, each having battery partitions in series.
Figure 5B:
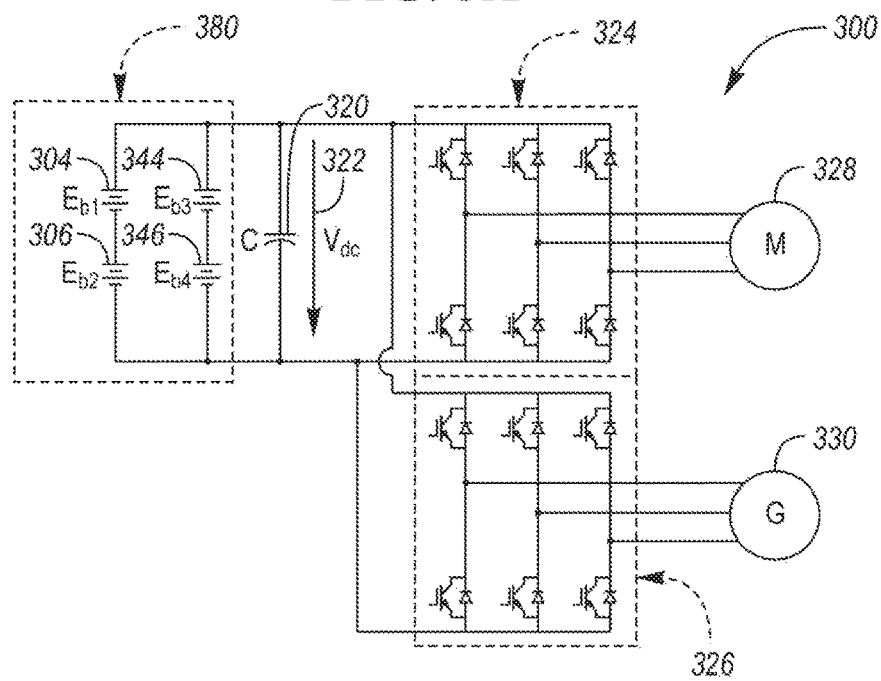
FIG. 5B is a schematic representation of the VVC of FIG. 5A.

As shown in FIGS. 5A and 5B, the battery modules 204, 206, 244, 246 and pairs 202, 242 may be arranged in any mixed combination of parallel and series circuits to form the desired output voltage. For example, the pairs 202, 242 may be arranged in parallel, and the battery modules 204 and 206 may be arranged in series, battery modules 244 and 246 may be arranged in series, schematically forming an electrical drive system 300 having a variable voltage. The electrical drive system 300 has an energy store 380 having each battery module 304 and 306 in series, each battery module 344 and 346 in series, pairs 202 and 242 are parallel with the bus $V_{dc}$ 322 and DC link capacitor 320. The voltage, $V_{dc}$ 322, on the bus powers a pair of inverters 324, 326, which are coupled to electric machines 328, 330. $V_{dc}$ 322 is equal to the sum of the battery modules 304 and 306, or 344 and 346. Any number of inverters or electric machines may be used. Multiple inverters may feed a single electric machine or vice versa.

Figure 6:
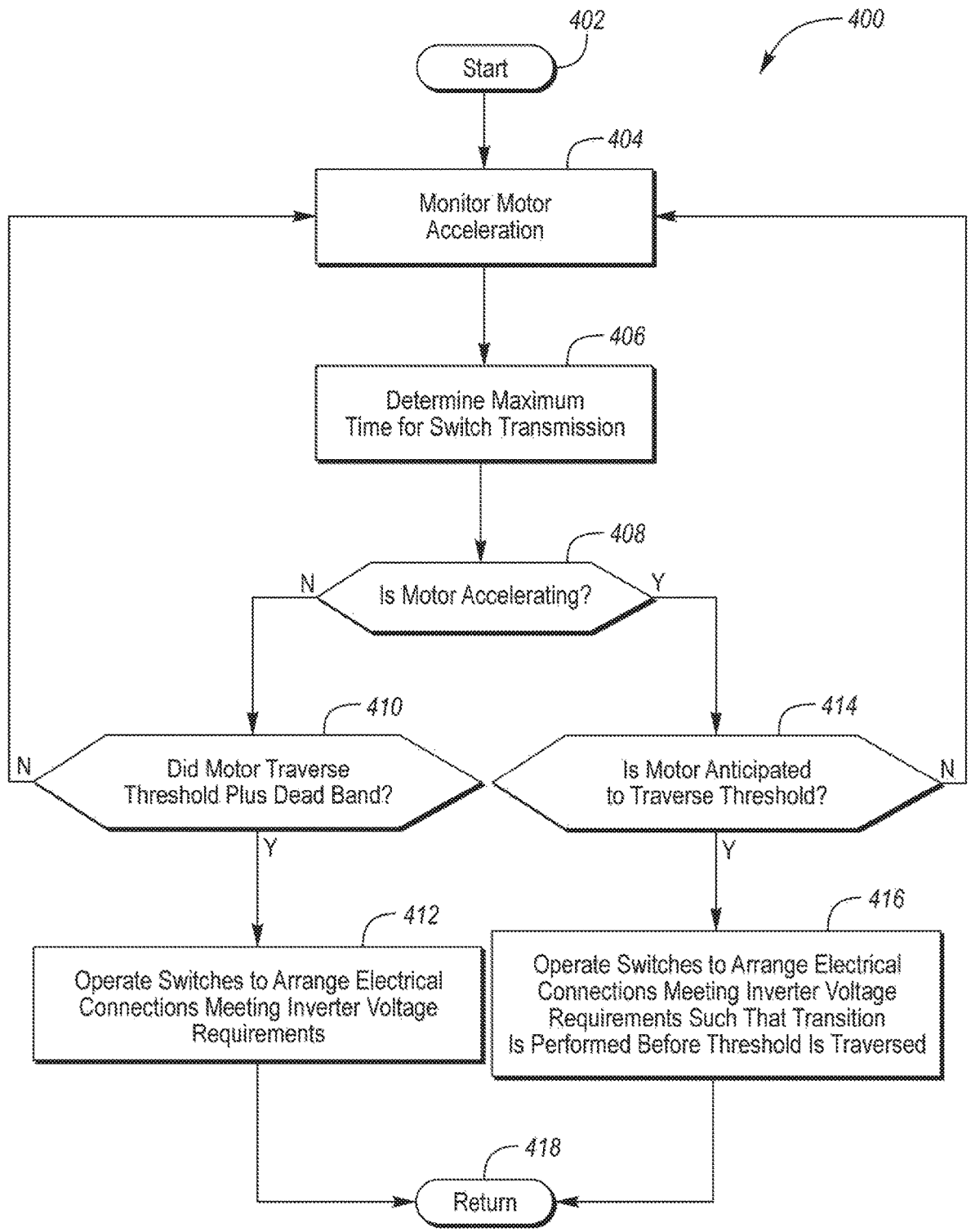
FIG. 6 is an algorithm for controlling switches of the VVC.

Referring to FIG. 6, a flow diagram 400 is shown. The flow diagram 400 may be embedded within a controller as an algorithm to implement the teachings of this disclosure. The controller may be any combination of processors, memory and other hardware used to control machinery, receive user input, and coordinate vehicle functions. The controller may be separate and distinct devices or a single entity. In step 402, the process begins. In step 404, electric machine acceleration is monitored. The electric machine acceleration provides information for predictive analysis. In step 406, the maximum time for switch transition is determined or retrieved. The maximum time for switch transition may be based on the number of switches requiring a transition, the mean time to close for the switches requiring actuation, the maximum time to close for one of the switches requiring actuation, or other methods. In step 408, the sign of the acceleration is determined.

Crossing the predetermined threshold with positive acceleration may require proactive switching to ensure enough voltage is available to the inverter for a speed of the electric machine. For example, the inverter may require a voltage above 300 volts to supply drive signals to the electric machine speeds above a predetermined threshold (e.g., 1,000 RPMs). To ensure proper torque delivery, the controller may arrange the switches to provide adequate voltage before it is required. If the motor is accelerating, as determined in step 408, the controller may anticipate the threshold being traversed in step 414, based on the magnitude of acceleration or other factors (e.g., driving history, circumstances). In step 416, the controller operates the switches to arrange the electrical connections between battery modules and pairs to meet inverter voltage requirements such that the transition is performed before the required threshold is traversed. For example, if the mean switch closure time is 15 ms and the inverter and motor are anticipated to require the higher voltage in 30 ms based on the acceleration of the motor, the controller may close the switches in 10 ms, ensuring the voltage requirement is met before it is required.

If the electric machine is decelerating, the controller may be configured with a dead band to ensure adequate voltage is available in case speed or torque commands fluctuate. After the determination of the sign of acceleration is determined in step 408, the controller may determine whether the motor has traversed the threshold plus a dead band 410. The controller may be configured to operate the switches to arrange the electrical connections to meet inverter voltage requirements such that the transition is performed after the threshold and the dead band is traversed. The controller may wait for a period of time after the predetermined threshold is traversed to actuate the switches to reduce the voltage of the energy store. The controller may wait for a duration to pass before reducing the voltage or establish a dead band that is a proportion of the predetermined threshold (e.g., 10%). In step 418, the algorithm is repeated.

Figure 7:
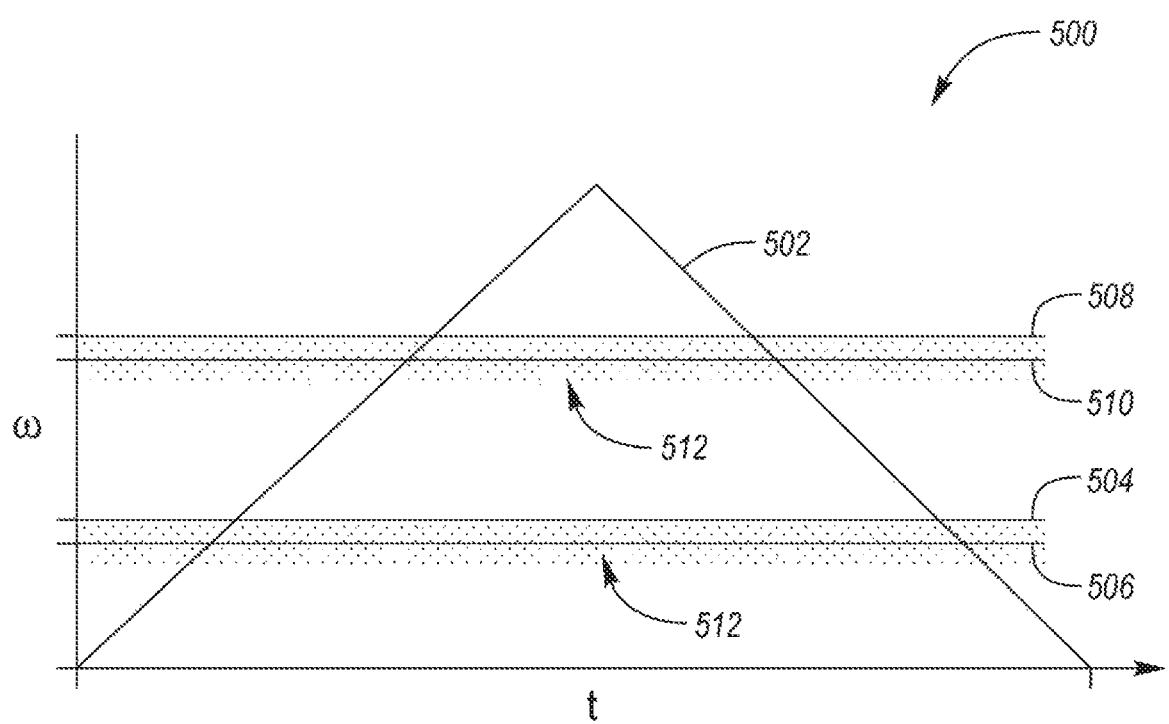
FIG. 7 is a graph depicting the first and second thresholds, dead bands, and switch transients.

Referring to FIG. 7, a graph 500 is shown. The graph 500 includes an electric machine speed curve 502. The electric machine speed curve 502 may be related to the voltage required by the inverter to obtain such speeds. A first threshold 504 is shown. In order for the inverter to have voltage available by the first threshold, the controller may be configured to organize the switches at the switch configuration threshold 506. The electric machine speed curve 502 may have a slope indicative of the acceleration of the electric machine. The electric machine may be predicted to cross the first threshold 504 using the slope of the speed curve 502. A second threshold 508 is shown. In order for the inverter to have voltage available by the second threshold 508, the controller may be configured to organize the switches at the switch configuration threshold 510. The electric machine speed curve 502 may have a slope indicative of the acceleration of the electric machine. The electric machine may be predicted to cross the second threshold 508 using the slope of the speed curve 502. The thresholds 504, 508 may also form ranges that define desirable voltages related to the electric machine speed. For example, one range is formed between an electric machine speed of zero and the first threshold 504. Another range is formed between the first threshold 504 and the second threshold 508.

A dead band 512 may be used during deceleration to prevent unnecessary switching operations. The dead band 512 is associated with each of the first and second thresholds 504, 508. The dead band 512 may be different for each. The dead band may be determined based on the number of switches requiring change or other factors.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an electric machine;
an inverter coupled to the electric machine;
a battery having a first plurality of cells connected in series, and a second plurality of cells connected in series;
a first switch configured to selectively connect a positive polarity output of the first plurality of cells to a negative polarity output of the second plurality of cells;
a second switch configured to selectively connect the positive polarity output of the first plurality of cells to a positive polarity output of the second plurality of cells;
a third switch configured to selectively connect a negative polarity output of the first plurality of cells to the negative polarity output of the second plurality of cells; and
a controller configured to operate the first, second, and third switches to selectively connect the first plurality of cells in series with the second plurality of cells to provide a first voltage to the inverter associated with operating the electric machine within a first speed range, and to selectively connect the first plurality of cells in parallel with the second plurality of cells to provide a second voltage to the inverter associated with operating the electric machine within a second speed range.

2. The vehicle of claim 1 wherein the controller operates the switches in response to rotational acceleration of the electric machine in addition to speed range of the electric machine.

3. The vehicle of claim 2 wherein the controller operates the switches in response to the acceleration being positive or negative.

4. The vehicle of claim 2 wherein the controller operates the switches based on an associated switching speed of the switches.

5. The vehicle of claim 1 wherein the controller is programmed to operate the switches based on whether rotational acceleration of the electric machine is positive or negative.

* * * * *